(12) United States Patent
Itou et al.

(10) Patent No.: US 7,639,320 B2
(45) Date of Patent: Dec. 29, 2009

(54) LIQUID CRYSTAL DISPLAY DEVICE

(75) Inventors: Osamu Itou, Hitachi (JP); Tatsuya Sugita, Takahagi (JP); Masaya Adachi, Hitachi (JP); Shinichi Komura, Mobara (JP); Shoichi Hirota, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 247 days.

(21) Appl. No.: 11/869,900

(22) Filed: Oct. 10, 2007

(65) Prior Publication Data
US 2008/0084517 A1 Apr. 10, 2008

(30) Foreign Application Priority Data
Oct. 10, 2006 (JP) .............................. 2006-275964

(51) Int. Cl.
*G02F 1/1335* (2006.01)
(52) U.S. Cl. .............................. 349/95; 349/65; 349/106

(58) Field of Classification Search .................... 349/95
See application file for complete search history.

(56) References Cited

U.S. PATENT DOCUMENTS 4,798,448 A * 1/1989 van Raalte .................. 349/62

FOREIGN PATENT DOCUMENTS

| JP | 2003-015121 | 1/2003 |
| JP | 2003-015122 | 1/2003 |
| JP | 2005-353650 | 12/2005 |

* cited by examiner

*Primary Examiner*—Richard H Kim
(74) *Attorney, Agent, or Firm*—Antonelli, Terry, Stout & Kraus, LLP.

(57) ABSTRACT

In a liquid crystal display device, rays of light of a light source for blue light emission are concentrated on a fluorescent material by using a lens of a first micro-lens array and fluorescent rays from the fluorescent material are concentrated on a pixel of corresponding color by using a lens of a second micro-lens array.

19 Claims, 14 Drawing Sheets

LIQUID CRYSTAL DISPLAY DEVICE

BACKGROUND OF THE INVENTION

The present invention relates to a liquid crystal display device having high display efficiency.

A portable information apparatus as represented by a cellular phone is expected to have multifunction and high grade function while making its communication speed high, thus being needed to accommodate itself to image information of large capacity and is therefore required of high picture quality and ability to perform high definition display. To elaborate on the high picture quality, high contrast, high color reproductivity, wide viewing angle and outdoor legibility can stand for. On the other hand, because of incorporation of various kinds of devices in limited weight and volume, reduced thickness, reduced weight and low power consumption are also required.

The portable information device is used in a variety of environments, in an extremity of bright environment such as direct rays of the sun in the midsummer and in an extremity of dark environment such as a darkroom. For the purpose of obtaining relatively excellent displays throughout the variety of environments, a transflective type liquid crystal display device having a transmissive area and a reflective area within one pixel has been employed frequently.

A white light emitting diode is used as the light source of liquid crystal display device in which emitted blue light is transmitted through a fluorescent material for yellow light emission so that both colors are mixed to produce white color. The liquid crystal display device also has a light absorptive color filter in it. The filter in combination with the liquid crystal display device as an optical shutter, achieves a color display.

Another light absorptive member is also used in the liquid crystal display device and is responsible for reduction in display efficiency of the liquid crystal display device. Among the light absorptive members, a polarization plate and the color filter have high light absorption factors in the extreme but they play a fundamental role in the principle of display in the liquid crystal display device.

In order to improve the display efficiency of liquid crystal display device, various kinds of optical elements have been contrived. In connection with the aforementioned transflective liquid crystal display device, the use of a micro-lens has been thought of. More particularly, in the transflective liquid crystal display device, the area of one pixel is divided into one part for transmissive display and the other major part for reflective display, most of rays of light incident upon which is unusable. Then, it is expected that by concentrating rays of the light source to the transmissive display part through the micro-lens, most of rays of the light source can be utilized efficiently in principle.

Alternatively, the use of color conversion based on fluorescent materials has been considered. In other words, the light source ray is chosen as being ultraviolet light or blue light which can be converted into red, green or blue light by using the fluorescent materials. Subsequently, these rays of light come to or are incident on corresponding color filters, with expectation that the light absorption by the color filter can be reduced in principle. In addition to the fluorescent material, a hologram, for example, is used to separate a ray of white light of light source into its spectral components of red, green and blue which in turn are caused to be incident on corresponding color filters, thereby expectantly attaining a similar effect in principle.

Improvements in display efficiency of the liquid crystal display device based on the micro-lens and hologram are described in JP-A-2003-15121 or JP-A-2003-15122, for example. Improvements in efficiency achieved by converting the blue light from a light emitting diode arranged on the side quarter into red, green and blue rays of light through the uses of the fluorescent material are described in JP-A-2005-353650.

SUMMARY OF THE INVENTION

When the micro-lens and hologram are used as in the case of the prior arts, the micro-lens cannot concentrate light sufficiently unless rays of the light are highly collimated and besides three of the hologram, micro-lens and liquid crystal panel are required to be aligned, encountering difficulties in production. The fluorescent material used has such a nature that in the course of absorbing the light source ray, it dissolves polarization to luminesce and scatters the light. Unless components ranging from the light source to the liquid crystal panel are designed in consideration of the nature as above, the desired effect of improving the display efficiency cannot be obtained.

In the light of the above problems, an object of the present invention is to provide a liquid crystal display device capable of attaining high display efficiency by using spectroscopy and light concentration in optimal combination.

To accomplish the above object, according to one aspect of the present invention, a liquid crystal display device comprises a liquid crystal panel including a first substrate, a second substrate and a liquid crystal layer sandwiched between the first and second substrates, a light source for emitting blue light and a light conversion layer interposed between the liquid crystal panel and the light source and including a first micro-lens array having a plurality of lenses arranged, a second micro-lens array having a plurality of lenses arranged and a fluorescent layer interposed between the first and second micro-lens arrays.

The first micro-lens array of light conversion layer has the function to concentrate blue light from the light source on the fluorescent layer and the second micro-lens array of light conversion layer has the function to concentrate fluorescent rays emitted from the fluorescent layer or the blue light from the light source on a corresponding pixel in the liquid crystal panel.

Each of the plurality of lenses of first micro-lens array has a sectional form which is convex toward the side on which the light source is arranged and each of the plurality of lenses of second micro-lens array has a sectional form which is convex toward the side on which the liquid crystal panel is arranged.

The light source has a blue light emitting diode which is arranged at one end (corresponding to the one side quarter of the liquid crystal display device) of a light guide and the light guide is mounted with a hologram or blazed grating which converts the luminescence of the blue light emitting diode into a plane light source and directs it toward the normal direction of the liquid crystal panel.

According to another aspect of the invention, a liquid crystal display device comprises a liquid crystal panel including a first substrate, a second substrate and a liquid crystal layer sandwiched between the first and second substrates, a pair of polarization plates for sandwiching the liquid crystal panel, a light source for emitting rays of blue light, a light guide arranged between the liquid crystal panel and the light source, a light conversion layer arranged between the liquid crystal panel and the light guide and including a first micro-lens array having a plurality of lenses arranged, a second micro-lens array having a plurality of lenses arranged and a fluorescent layer arranged between the first micro-lens array and the light guide, and a fluorescent ray reflective layer interposed between the light guide and the fluorescent layer, wherein one of the paired polarization plates is arranged between the first and second micro-lens arrays.

Each of the plurality of lenses of first micro-lens array has a sectional form which is convex toward the side on which the liquid crystal panel is arranged and each of the plurality of lenses of second micro-lens array has a sectional form which is convex toward the side on which the light source is arranged.

According to the present invention, a liquid crystal display device can be provided which can attain high display efficiency by using spectroscopy and light concentration in optimal combination.

Other objects, features and advantages of the invention will become apparent from the following description of the embodiments of the invention taken in conjunction with accompanying drawings.

DETAILED DESCRIPTION OF THE EMBODIMENTS

The present invention will now be described by way of example with reference to the accompanying drawings.

Embodiment 1

Figure 1:
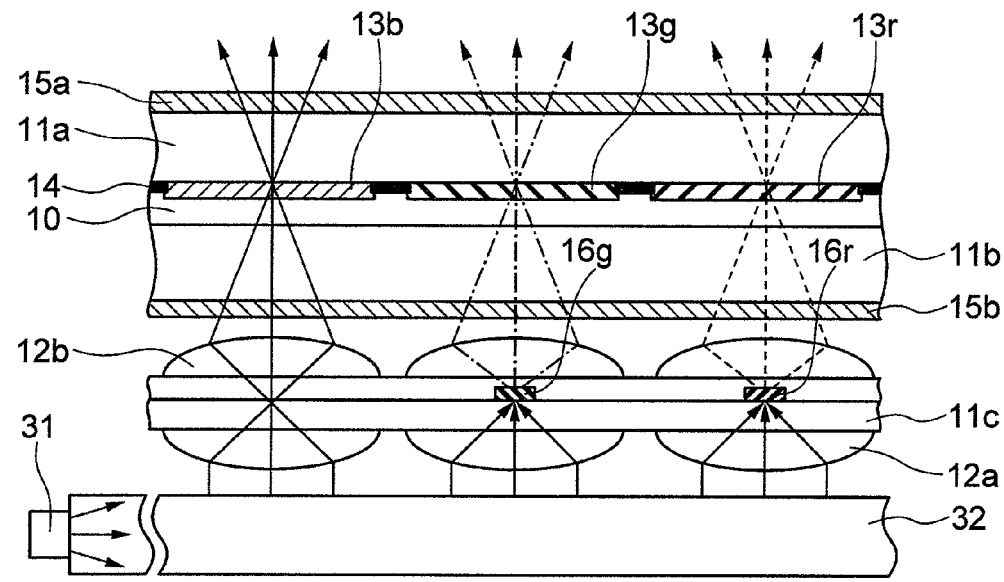
FIG. 1 is a sectional diagram showing principal constituent members employed when a light conversion layer is formed by using a third substrate and the function the members have.

Principal constituent members of a liquid crystal display device according to the invention and the function thereof are diagrammatically illustrated in FIG. 1.

In the liquid crystal display device shown in FIG. 1, a light guide 32, a light conversion layer and a liquid crystal display panel are sequentially stacked or laminated and a light source 31 for emitting blue light is arranged at one end of the light guide 32. The light source 31 is a blue light emitting diode (blue LED) and emits blue light of short wavelengths in visual light region. The light guide 32 is provided with a dispersion element such as a hologram or blazed grating (diffraction grating) the reflective function or diffractive function of which acts to direct the blue light from the light source 31 arranged at the one end toward the normal direction of the substrate of liquid crystal display panel.

In FIG. 1, an optical path of blue light is depicted by solid line, an optical path of green light is depicted by chained and dotted line and an optical path of red light depicted by dotted line. The light conversion layer converts part of the blue light of light source into the green light and red light. The liquid crystal display panel has a plurality of pixels adapted to perform blue light display, red light display and green light display, respectively, whereas the light conversion layer functions to concentrate rays of light of a color corresponding to each display color pixel.

In the present embodiment, the light conversion layer is formed by sequentially laminating a first micro-lens array 12a having a plurality of lenses arranged, a third substrate 11c, a fluorescent layer (green and red fluorescent members or materials 16g and 16r) and a second micro-lens array 12b having a plurality of lenses arranged. The liquid crystal panel includes a pair of substrates (first and second substrates 11a and 11b), a liquid crystal layer 10 sandwiched between the paired substrates, a pair of polarization plates (first and second polarization plates 15a and 15b) which put the paired substrates therebetween, a color filter layer (color filter 13b for blue, color filter 13g for green and color filter 13r for red) and a black matrix 14.

Figure 2:
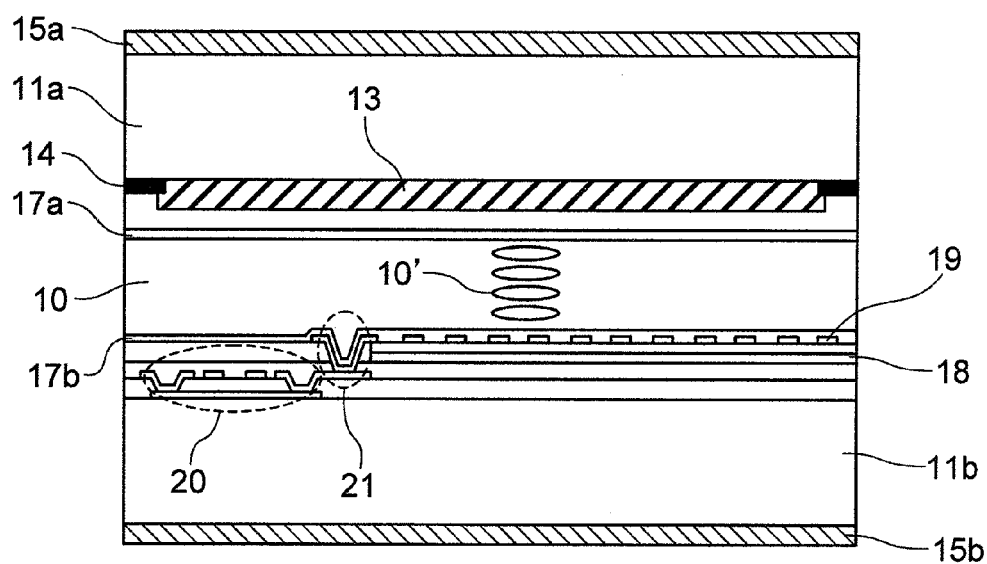
FIG. 2 is a sectional view of one pixel constituting a transmission type liquid crystal display panel according to embodiment 1.

Referring to FIG. 2, an example of one pixel of the liquid crystal display panel is illustrated in sectional form. The liquid crystal panel includes the first and second substrates 11a and 11b and the liquid crystal layer 10, with the first and second substrates 11a and 11b putting the liquid crystal layer 10 therebetween. A pair of alignment layers (first and second alignment layers 17a and 17b) for stabilizing the alignment state of liquid crystal molecules 10' filled in the liquid crystal layer 10 are respectively provided on the opposing surfaces of first and second substrates 11a and 11b which are in the proximity of the liquid crystal layer 10. Also, means for applying voltage to the liquid crystal layer 10 is provided for one or both of the first and second substrates 11a and 11b.

The first substrate 11a has excellent transparency and is made of borosilicate glass of less ionic impurity contents, having a thickness of about 400 μm. In the first substrate 11a, starting from the bottom close to the liquid crystal layer 10, the first alignment layer 17a, a leveling layer and the color filter 13 and black matrix 14 are laminated. The first alignment layer 17a is an organic polymeric layer of polyimide system and is subjected to alignment treatment through the rubbing method, resulting in a so-called horizontal alignment layer which gives a pre-tilt angle of about 2° to the liquid crystal layer 10. The color filter 13 has a planar structure in which stripe-shaped portions exhibiting red color, green color and blue color are arranged reiteratively. The black matrix 14 is formed of black resist, having a planar lattice distributive structure corresponding to the boundary between adjacent pixels.

Like the first substrate 11a, the second substrate 11b is made of borosilicate glass, having a thickness of about 400 μm. In the second substrate 11b, starting from the top close to the liquid crystal layer 10, the second alignment layer 17b, pixel electrode 19, inter-layer insulating film, common electrode 18, scanning lines, signal lines and active switch 20 are principally provided. Like the first alignment layer 17a, the second alignment layer 17b is an organic polymeric layer of polyimide system. Each of the pixel electrode 19 and common electrode 18 is formed of an indium tin oxide (ITO) exhibiting both the transparency and electric conductivity, having a thickness of 100 nm. The two electrodes are spaced apart from each other by means of an inter-layer insulating film of silicon nitride (SiN) having a thickness of 500 nm. While the pixel electrode 19 has a comb-teeth-like planar shape, the common electrode 18 is distributed over all of the individual pixels, so that under application of voltage, an arch-shaped electric field is established between the pixel electrode 19 and common electrode 18. The arch-shaped electric field is a so-called lateral electric field having a component parallel to the liquid crystal layer 10 and is so distributed as to swell out into the nearby liquid crystal layer, thus providing an in plane switching (IPS) type liquid crystal display panel which modifies the alignment state of liquid crystal molecules in the liquid crystal layer 10. In the IPS type liquid crystal display panel, the tilt angle increases slightly in the wake of voltage application, ensuring that a display of wide viewing angle which is excellent in gradation characteristics in the viewing angle direction can be obtained. Portions at which the pixel electrode 19 and common electrode 18 overlap with each other are coupled in parallel to the liquid crystal layer 10 to function as a retaining capacitor.

The signal lines and scanning lines cross one another and near an intersection of each signal line and each scanning line, an active switch 20 is provided which corresponds to the pixel electrode 19 in one to one correspondence relation. The pixel electrode 19 is applied with potential from the signal line via a contact hole 21 by means of the active element 20, operation of which is controlled through the scanning lines. The active element 20 is a thin film transistor having its channel portion formed of a poly-silicon layer of relatively high electron mobility. The poly-silicon layer is prepared by heating and sintering with a laser beam an amorphous silicon layer formed through chemical vapor deposition (CVD). Individual pixel electrodes controlled independently of one another are each rectangular and arranged in lattice on the second substrate 11b as will be seen from FIG. 2.

The liquid crystal layer 10 exhibits a nematic phase in a wide temperature range including room temperature and a positive dielectric constant anisotropy as well in which the dielectric constant a liquid crystal molecule has is larger in the alignment direction than in the vertical direction. To add, since the liquid crystal layer 10 assumes a high resistance, voltage drop is sufficiently small even during a retention period for the active element 20 to be turned off. Because of anti-parallelism of rubbing process directions for the first and second alignment layers 17a and 17b, homogeneous alignment can be set up in the liquid crystal layer 10. The alignment direction makes an angle of 15° to the comb-teeth direction of the signal electrode (comb-teeth-like) and besides an angle of 75° to the lateral electric field generated when voltage is applied.

The first and second polarization plates 15a and 15b are arranged on the outer surface of the first and second substrates 11a and 11b, respectively, to put the paired substrates therebetween. Each of the first and second polarization plates 15a and 15b contains iodic system pigment whose dichronism is utilized to convert natural light into linearly polarized light. The alignment direction of the iodic system pigment corresponds to the absorption axis and the absorption axes of the first and second polarization plates 15a and 15b are orthogonal to each other, with the absorption axis of the first polarization plate 15a being parallel to the liquid crystal alignment direction.

Structurally, in the light conversion layer, the first micro-lens array 12a, third substrate 11c, fluorescent layer 16 and second micro-lens array 12b are laminated in sequence, beginning with the side close to the light guide 32 as shown in FIG. 1. The first micro-lens array 12a is distributed in a stripe fashion on the third substrate 11c and prepared through press stamper work, printing process or photolithography. In the press stamper work, a resin layer is formed on the third substrate 11c and while the resin layer being overheated for softening, a stamper is pressed thereon to form a convex section. In the printing process, resin in molten condition or a resin solution is dropped for formation. In the photolithography, after resist is worked into stripes, the resulting member is molten by heating to form a meniscus which in turn is sintered to be solidified. Of these processes, the press stamper work using a stamper features the highest working accuracy to permit a micro-lens of excellent light concentration capability to be formed. The printing process, on the other hand, can be executed at the lowest cost and can comply with various kinds.

The fluorescent material 16 is formed in a region centered on the focal point of the lens of first micro-lens array 12a. More particularly, the first micro-lens array 12a is so designed that its focal point is positioned on the upper or top surface of third substrate 11c which is close to the second micro-lens array 12b. In other words, when parallel rays of monochromatic light come to a lens of first micro-lens array 12a in a direction parallel to the normal of third substrate 11c, the rays of light are ideally concentrated on the upper surface of third substrate 11C which is close to the second micro-lens array 12b. At that time, the fluorescent material is formed in a region centered on a portion on which blue light from the light source is concentrated on the upper surface of third substrate 11c which is close to the second micro-lens array 12b.

It is necessary for the fluorescent layer to absorb the blue light from the light source 31 so as to fluoresce and therefore, blue light absorbent organic and inorganic fluorescent materials have been developed. For example, $(Y, Gd)_3(Al, Ga)_5O_{12}:Tb^{3+}$ is usable as a blue light absorbent and green light emitting inorganic fluorescent member. For example, $(Ca, Sr, Zn)S:Eu^{3+}$, $(Y, Gd)_2O_2S:Eu^{3+}$ is usable as a blue light absorbent and red light emitting inorganic fluorescent member. For example, coumarinic system pigment or naphthalic system pigment is usable as a blue light absorbent and green light emitting organic fluorescent member. For example, pyrimidine system pigment, Rhodamine system pigment or oxazine system pigment is usable as a blue light absorbent and red light emitting organic fluorescent member. At present, the organic fluorescent material has a tendency toward higher light emitting efficiency but from the standpoint of acclimation to withstand climate, the inorganic fluorescent material surpasses.

The light source for emitting blue light can be used as it is for blue light display and therefore any fluorescent member need not be arranged at the focal point of a lens of first micro-lens array 12a corresponding to a blue light display pixel. In this case, the fluorescent layer is constructed of only fluorescent material 16r for red color and fluorescent material 16g for green color. In an alternative, with a viewing to changing color tone of blue light display, a color filter for blue may be arranged at the focal point of a lens of first micro-lens array 12a corresponding to the blue color display pixel.

Figure 3A:
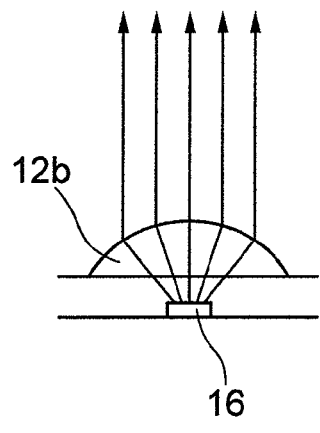
FIGS. 3A to 3C are diagrams for explaining changes in optical path occurring when the positional relation between the focal point of second micro-lens array and the fluorescent layer is changed.
Figure 3B:
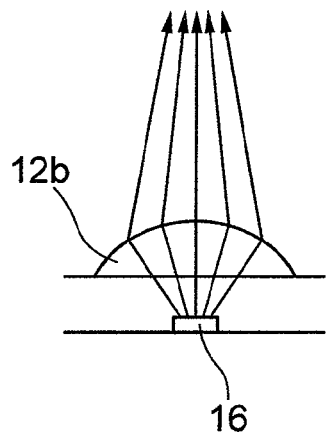
Figure 3C:
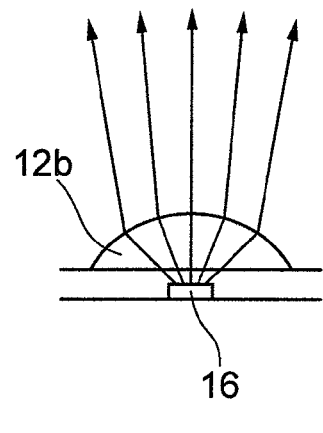

After a leveling layer has been formed on the upper surface of fluorescent layer, the second micro-lens array 12b is formed thereon. If, as shown in FIG. 3A, the position of a fluorescent material 16 coincides with the focal point of a lens of second micro-lens array 12b, rays of light from the fluorescent material are converted into parallel rays by means of the lens of second micro-lens array 12b. But in case the position of the fluorescent material 16 deviates from the lens of second micro-lens array 12b in excess of its focal point as shown in FIG. 3B, rays of light from the fluorescent material are converted into convergent rays by means of the lens of second micro-lens array 12b. Further when the position of the fluorescent material 16 is closer to the lens of second micro-lens array 12b than to its focal point as shown in FIG. 3C, rays of light from the fluorescent material are converted into divergent rays by means of the lens of second micro-lens array 12b.

In other words, in order for the luminescent rays to be concentrated on the center of a corresponding pixel, it is preferable that, as shown in FIG. 3B, the fluorescent material be arranged at a position which is remote from the lens of second micro-lens array 12b in excess of its focal point. Since the plane distribution of the first micro-lens array 12a is in the form of stripes, the corresponding second micro-lens array 12b is also distributed in a plane stripe fashion.

Figure 4:
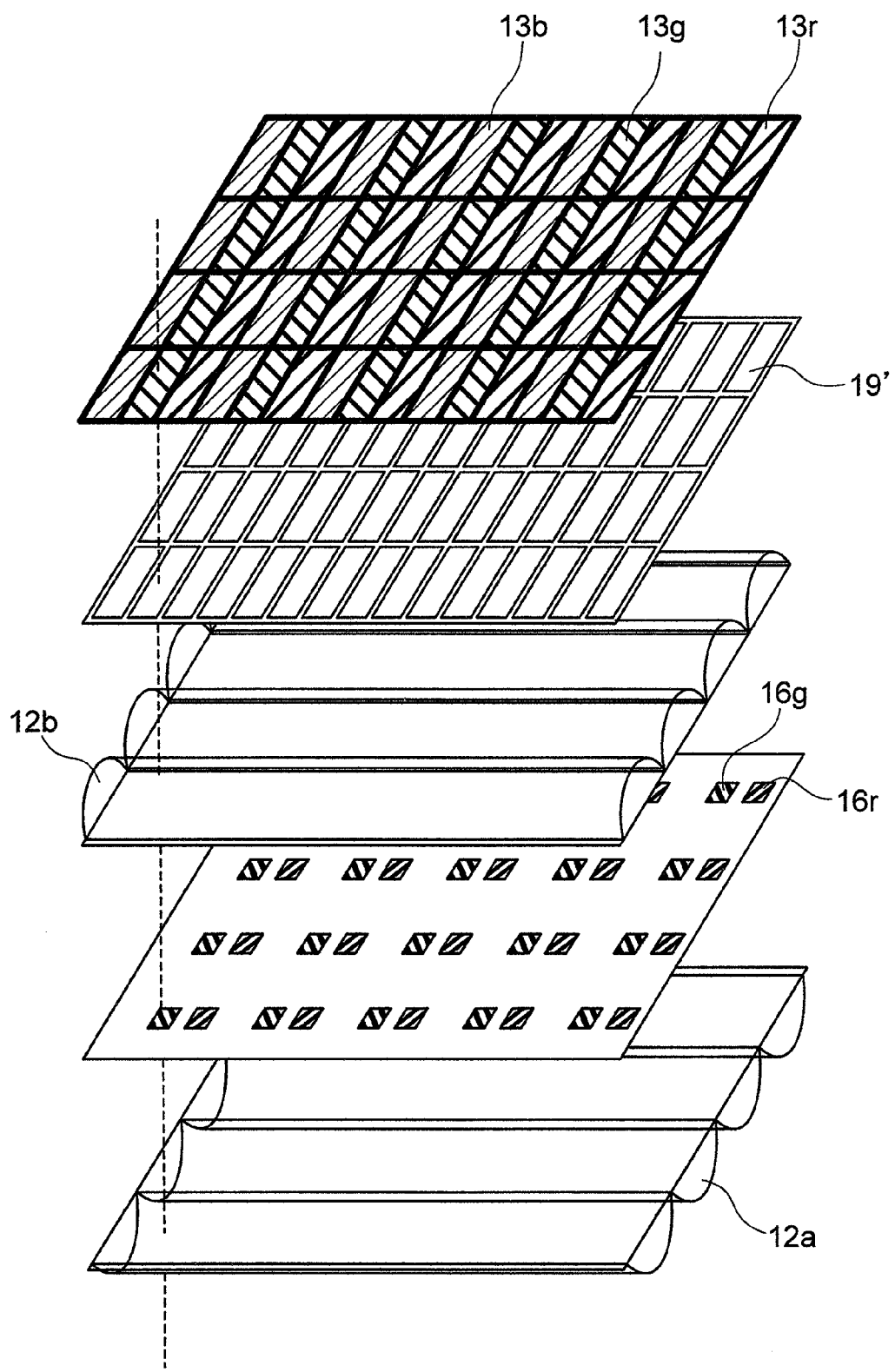
FIG. 4 is an exploded perspective diagram showing the correspondence relation among the first micro-lens array, fluorescent layer, second micro-lens array, pixels above the second substrate and color filters on the first substrate.
Figure 5:
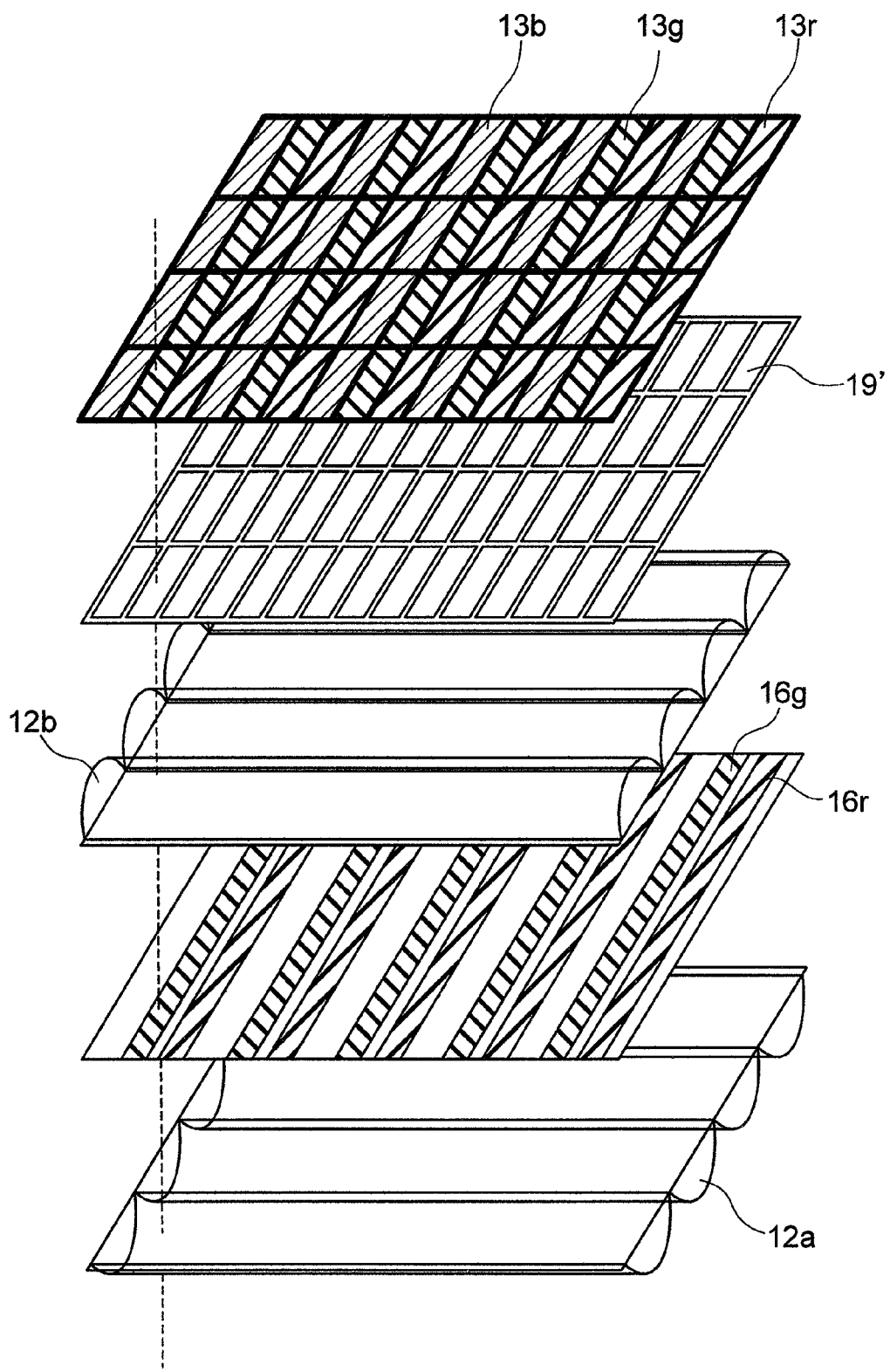
FIG. 5 is an exploded perspective diagram showing the correspondence relation among the first micro-lens array, fluorescent layer, second micro-lens array, pixels above the second substrate and color filters on the first substrate.

The correspondence relation among the first micro-lens array 12a, fluorescent layer, second micro-lens array 12b, pixels above the second substrate 11b and color filters on the first substrate 11a is illustrated in FIGS. 4 and 5.

Pixels 19' depicted in FIG. 4 or 5 correspond to a lattice (matrix) structure formed by scanning lines and signal lines, schematically showing a range in which the influence of an electric field formed by the common electrode and pixel electrode prevails. By taking notice of one of green color pixels at the left-lower edge inside a display region of the liquid crystal display panel shown in FIG. 4 or 5, dotted line indicates the correspondence relation between an overlying color filter and an underlying second micro-lens array 12b. Exemplarily, in FIG. 5, the color filters (blue color filter 13b, green color filter 13g and red color filter 13r) and the fluorescent layer (red fluorescent member 16r and green fluorescent member 16g) have each a structure of stripes which are parallel to the major side of the individual pixels and each of the first and second micro-lens arrays 12a and 12b has a structure of stripes which are parallel to the minor side of the individual pixels. Illustrated in FIG. 4 is an instance where the color filter (blue color filter 13b, green color filter 13g and red color filter 13r) has a structure of stripes which are parallel to major sides of individual pixels and the fluorescent layer (red fluorescent member 16r and green fluorescent member 16g) has an arrangement of rectangular dots. It will be appreciated that in FIG. 4 or 5, no fluorescent member corresponding to the blue pixel is arranged, permitting the blue light from the light source to be incident as it is.

Figure 6A:
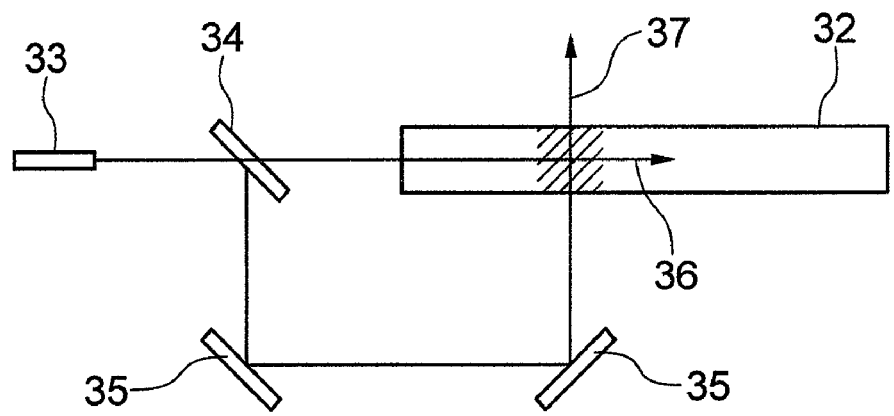
FIGS. 6A to 6C are diagrams useful to explain a method of forming a light guide when a volume hologram is used as the light guide and optical paths in that case.
Figure 6B:
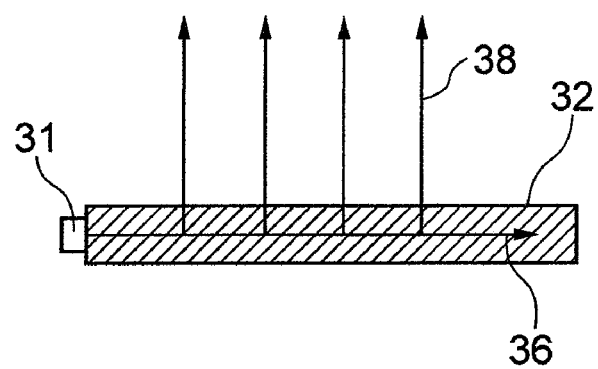
Figure 6C:
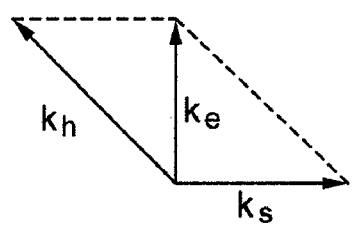

In order that the blue light of light source coming to the light guide 32 can be converted into a plane light source of high parallelism directed to the light conversion layer, the light guide per se can be, for example, a volume hologram. Namely, the light guide is formed of a light sensitive member to which mutually interferential laser beams come in two directions to cause an interference inside the light guide so that an optical reaction may proceed at portions for mutual intensification of beams to increase the refractive index. Through this process, a periodical change of refractive index characterized by a lattice vector $k_h$ can be established inside the light guide. Where the light source has a wave number vector of $k_s$, the outgoing light heading for the light conversion layer has a wave number vector of $k_e$ which satisfies $k_e = k_s + k_h$. Since rays of the light source at the end of the light guide come to the light guide and the outgoing light is directed in the normal direction of the light guide, $k_e$ is orthogonal to $k_s$, indicating that $k_e$, $k_s$ and $k_h$ are related to one another as illustrated in FIG. 6C. A laser beam from the same laser light source 33 is caused by means of half mirrors 34 and 35 to branch, as shown in FIG. 6A, to the mutually interferential laser beams impersonating a reference beam 36 and an object beam 37 which cross with each other inside the light guide 32. Generally, the laser beam is sized to have a small diameter and hence by scanning intersections, a volume hologram can be formed on the entire surface of the light guide. Then, as shown in FIG. 6B, the outgoing beam heading for the light conversion layer can be taken for a reproduction beam 38 and the beam from the light source can be taken for a reference beam 36, demonstrating that the method explained in connection with FIGS. 6A and 6B resembles a general hologram preparing method.

The wave number vectors $k_e$ and $k_s$ contain wavelengths and so the diffraction angle of volume hologram depends on the wavelength. Therefore, when white light is incident on the volume hologram, it is separated to different optical paths in accordance with wavelengths but the blue light emitting diode emits a luminescent spectrum of a narrow half value of about 50 nm approximating monochromatic light and optical paths of all rays of luminescence are converted to be directed in substantially the same direction.

Figures 7A, 7B:
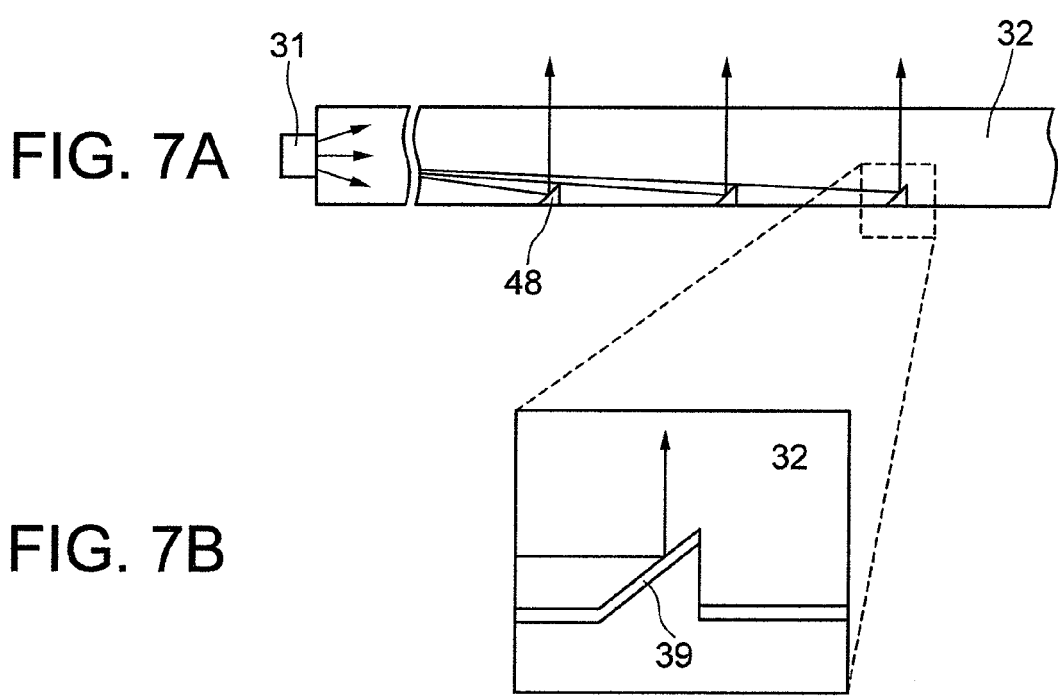
FIGS. 7A and 7B are diagrams for explaining a structure in which a blazed grating is arranged on the bottom of light guide and how the structure functions.

When light sources 31 having blue light emitting diodes are arranged concentrically on one point at the end of light guide 32, a state approximating one point light source arranged at the end of light guide 32 can be set up and the direction of light source rays incident on an arbitrary point in the light guide 32 can be determined definitely. In order that the incident light can be reflected efficiently in the normal direction of the liquid crystal panel, the light guide 32 may be mounted with a blazed grating. With a blazed grating 48 arranged at the bottom of light guide 32 as shown in FIGS. 7A and 7B, a metal of high reflection factor such as aluminum is vapor-deposited on the grating to form a meal layer 39 which sets an angle satisfying a condition of positive reflective in the normal direction of liquid crystal display panel, with the result that the light source ray can be reflected from respective elements of grating 48 in the normal direction and so plane light sources of excellent collimation can be obtained. Since the blue light approximating monochromatic light described as above is converted in its optical path by means of the hologram or blazed grating, plane light sources of excellent parallelism or collimation can be obtained. This can make full use of the concentration effect of the micro-lens.

As described above, by interposing the fluorescent materials between the paired micro-lens arrays, dispersion of optical path due to light scattering caused by the fluorescent material can be prevented and concentration of light on the inside of a corresponding pixel on the liquid crystal panel can be achieved even when the fluorescent material is used. Further, the blue luminescence can be converted into green or red color by means of the fluorescent material and then can be concentrated on a pixel of corresponding display color by means of the micro-lens. Conventionally, in the major liquid crystal display device, part of blue light emission is converted by means of a yellow fluorescent material into yellow fluorescence which in turn is absorbed by red, blue and green color filters to provide color displays. In this process, the loss of light attributable to absorption by the color filter is large particularly in the latter step, giving rise to a cause of a degraded efficiency. Due to the fact that the luminescent efficiency of the fluorescent material in the present invention is higher as compared to the transmission efficiency of the color filter, displays of higher efficiency can be obtained.

Embodiment 2

Figure 8A:
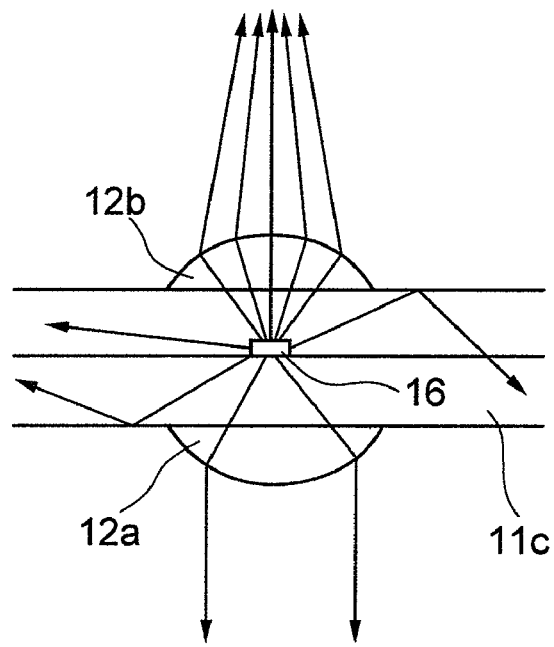
FIGS. 8A and 8B are diagrams for explaining optical paths of luminescent rays emitted from the fluorescent layer and the function of fluorescence reflective layer.

The fluorescence from a fluorescent material of fluorescent layer has such a nature as to expand about the center of the fluorescent material in an isotropic fashion. Some of typical optical paths of luminescence emitted from the fluorescent material are illustrated in FIG. 8A.

In addition to a fluorescence component directed to the front associated with the second micro-lens array 12b, there is a fluorescence component directed to the rear associated with the first micro-lens array 12a. Besides, fluorescence components directed to the side quarter or opposite ends also exist which repeat multiple reflection inside the light conversion layer. The components directed to the ends and the rear are responsible for a degraded efficiency and besides, if they stray so as to be incident on pixels they do not correspond to, a degradation in color purity will be caused.

In the present embodiment, with the aim of preventing the efficiency degradation and the occurrence of stray light, a fluorescence reflective layer 22 comprised of a metal layer of high reflection factor is arranged around the fluorescent member 16. The fluorescence reflective layer 22 is arranged sideward of the fluorescent member 16 so that a fluorescent component heading for the opposite ends may be caused to be incident on the fluorescence reflective layer 22. The light source ray coming from the rear is not blocked and so a fluorescence reflective layer 22 is also arranged to partly cover the rear so that as many fluorescent components as possible directed to the rear may be caused to be incident on the fluorescence reflective layer 22.

Figure 8B:
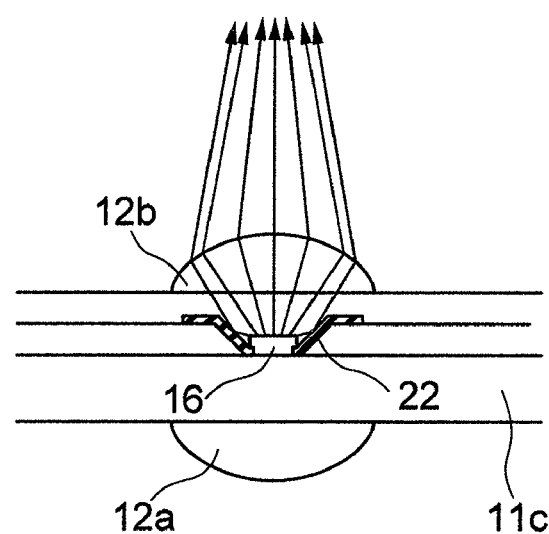

Specifically, as shown in FIG. 8B, the fluorescence reflective layer 22 inclined by about 45° to the upper surface of the third substrate 11c is arranged peripherally of each fluorescent material of the fluorescent layer. The fluorescence reflective layer 22 is formed of a metal layer of high reflection factor. The fluorescence component directed to the opposite ends is reflected at the fluorescence reflective layer 22 to return to the fluorescent layer and as a result, no light directed to the ends is generated. Further, since most of rays of light heading for the rear are also reflected at the fluorescence reflective layer 22 to return to the fluorescent layer, the improvements in efficiency and the stray light prevention can be attained to advantage.

Embodiment 3

Figure 9A:
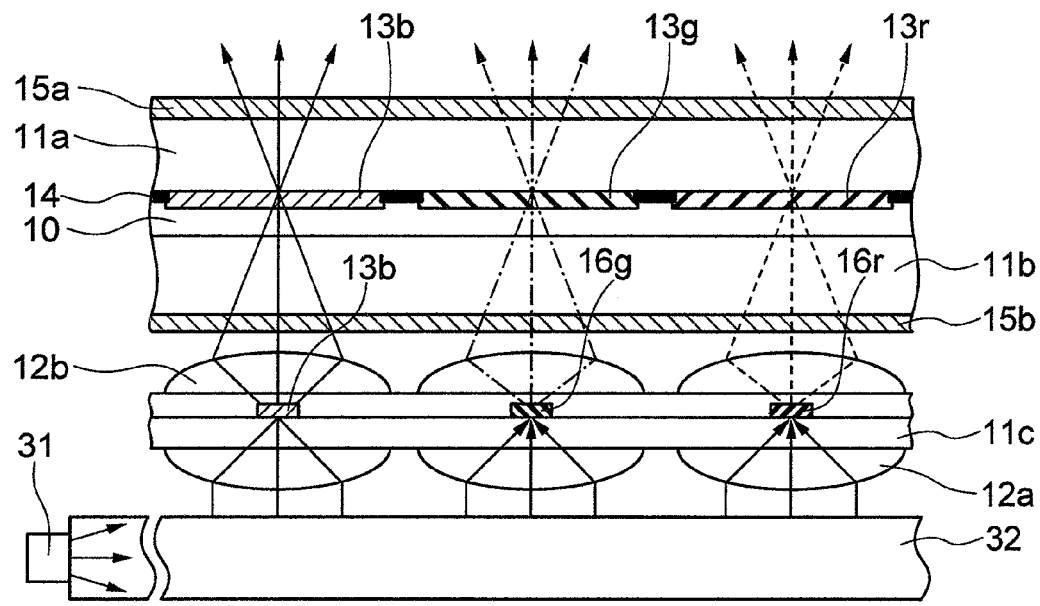
FIGS. 9A and 9B are sectional diagrams showing a light conversion layer mounted with a blue light color filter or light scattering layer on a focal point of first micro-lens array corresponding to a blue light display pixel.

In embodiment 1, the fluorescent layer is comprised of the fluorescent material 16r for red color and fluorescent material 16g for green color. Then, as shown in FIG. 9A, the blue color filter 13b is arranged on the focal point of the lens of second micro-lens array 12b corresponding to the blue display pixel. In this case, red light and green light are fluorescent rays which emits in an isotropic fashion about the center of the fluorescent material whereas the blue light does not undergo dispersion by a fluorescent material. Accordingly, the angle distribution of blue light having transmitted through the liquid crystal panel sometimes differs from those of the red light and green light. In such an event, the color tone of the light source per se changes with angles and disadvantageously, the display changes in color tone increases as the viewing angle changes.

Figure 9B:
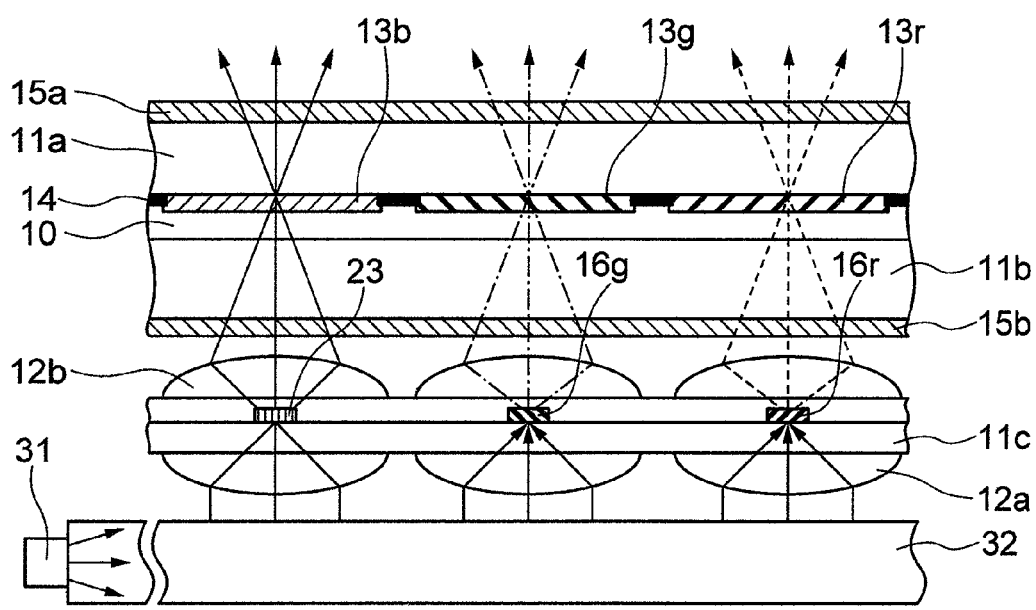

In the present embodiment, in order to make the angle distribution of blue light coincident with that of other kinds of color, a light scattering layer 23 is arranged on the focal point of the lens of first micro-lens array 12a corresponding to the blue display pixel as shown in FIG. 9B. For example, as the light scattering layer 23, transparent resist containing transparent fine particles can be used. In this case, patterning is possible through photolithography and the light scattering layer 23 can be formed selectively on the focal point of the lens of first micro-lens array corresponding to the blue light display pixel.

Generally, the diffractive index of the transparent fine particle differs from that of the transparent resist and diffraction takes place at the boundary between the two. By suitably adjusting the dispersion density and diffractive factor of the transparent particle and the thickness of the transparent resist in the light scattering layer 23, the same scattering action as that of the fluorescent material 16 can be given to the light scattering layer 23.

In the manner as above, the angle distribution can be mutually equal for the red light, green light and blue light and the change in color tone of display accompanying the change in viewing angle can be reduced.

Embodiment 4

Since, in the liquid crystal display device according to the invention, rays of light of color corresponding to display color of each pixel can be caused to be incident, the color display can be allowed even with the color filter on the first substrate 11a eliminated. In this case, the process steps for preparing the first substrate can be reduced, facilitating formation of the first substrate 11a.

When preparing the first and second micro-lens arrays 12a and 12b through printing process or lithography, a flat portion needs to be formed between adjacent lenses of the plurality of lenses. In other words, in the case of printing process, resin in molten condition or solution condition forms meniscuses which set up the micro-lens array but in the absence of a gap between adjacent meniscuses, the two meniscuses merge into one meniscus by surface tension, making it impossible to form meniscuses of micro-lens array corresponding to the individual pixels.

Figure 10A:
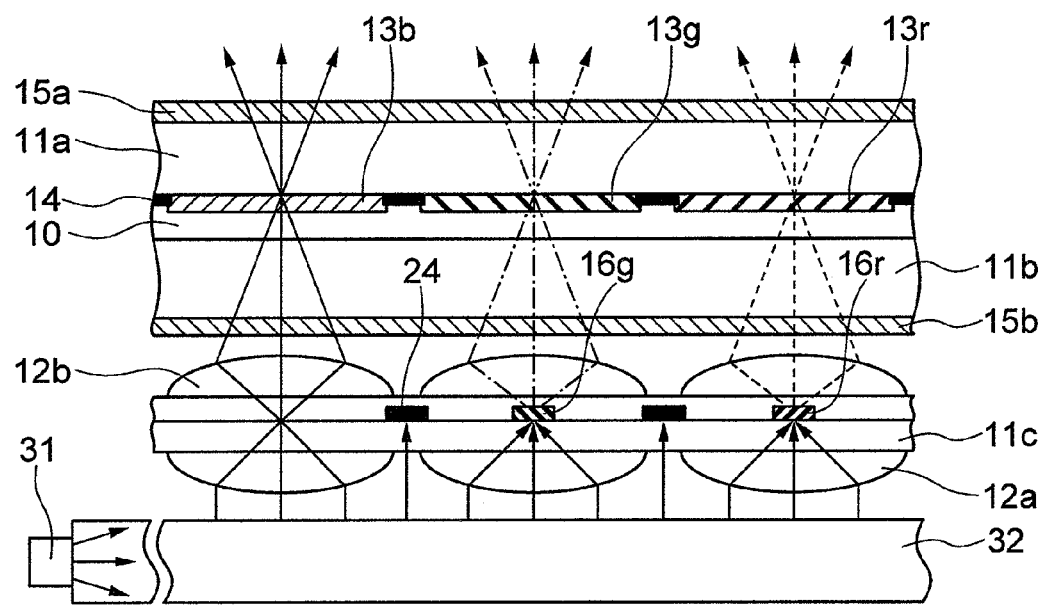
FIGS. 10A and 10B are sectional diagrams showing a structure of light conversion layer formed with a flat portion absorptive layer and a flat portion reflective layer, respectively.

The blue light luminescence coming to the flat portion fails to be incident on a fluorescent material but goes, without alteration, to the liquid crystal panel, so that it reaches the red color display pixel and green color display pixel of the liquid crystal display panel removed of the color filter at the flat portions as in the case of the present embodiment and the color purity is degraded. To avoid this inconvenience, a flat portion absorptive layer 24 such as black matrix, for example, is formed at a flat portion between adjacent micro-lenses as shown in FIG. 10A. Blue luminescence coming to the flat portion is absorbed by the black matrix and degradation in color reproductivity range caused by direct incidence of the blue luminescence can be prevented.

Figure 10B:
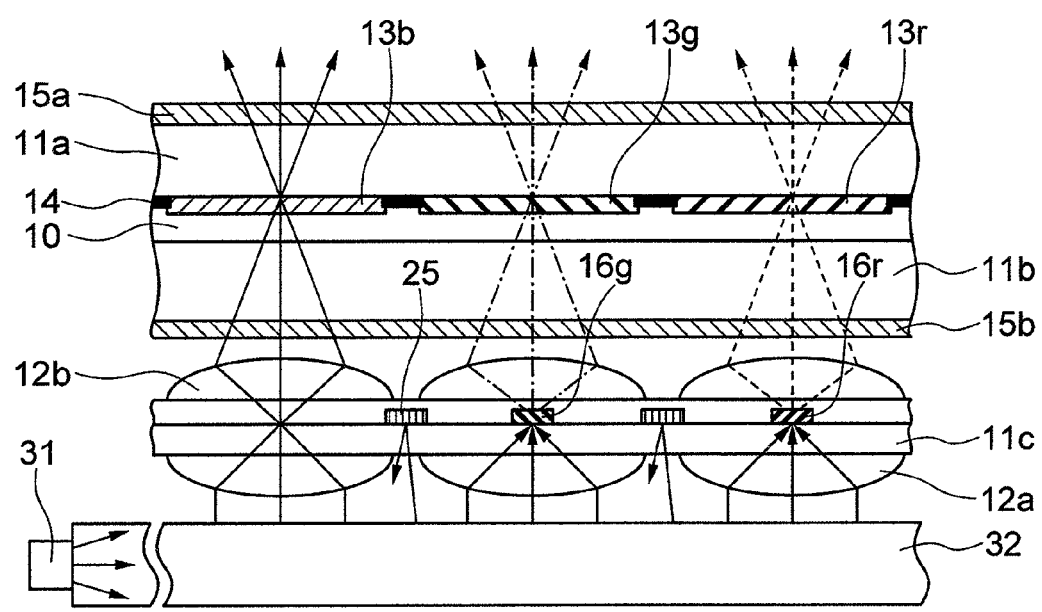

Alternatively, as shown in FIG. 10B, a flat portion reflective layer 25 may be formed at the flat portion. In this case, blue luminescence coming to the flat portion is reflected by means of the flat portion reflective layer 25, with the result that degradation in color reproductivity range due to direct incidence of the blue luminescence can be prevented. The fluorescence reflective layer 22 arranged, in embodiment 1, for prevention of occurrence of stray light may be distributed to extend up to the flat portion so as to also personate the flat portion reflective layer 25.

Figure 11A:
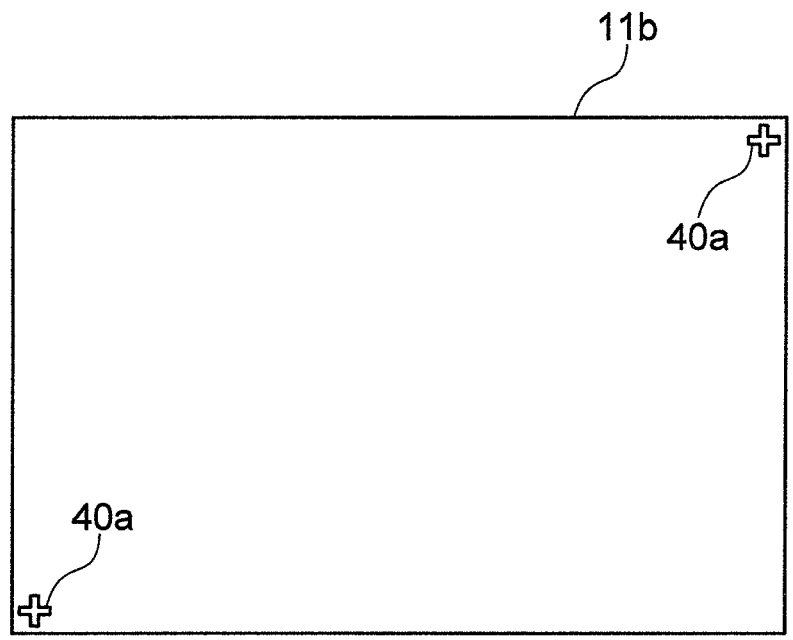
FIGS. 11A and 11B are plan views showing examples where positioning marks are arranged on the liquid crystal display panel and the light conversion layer, respectively.
Figure 11B:
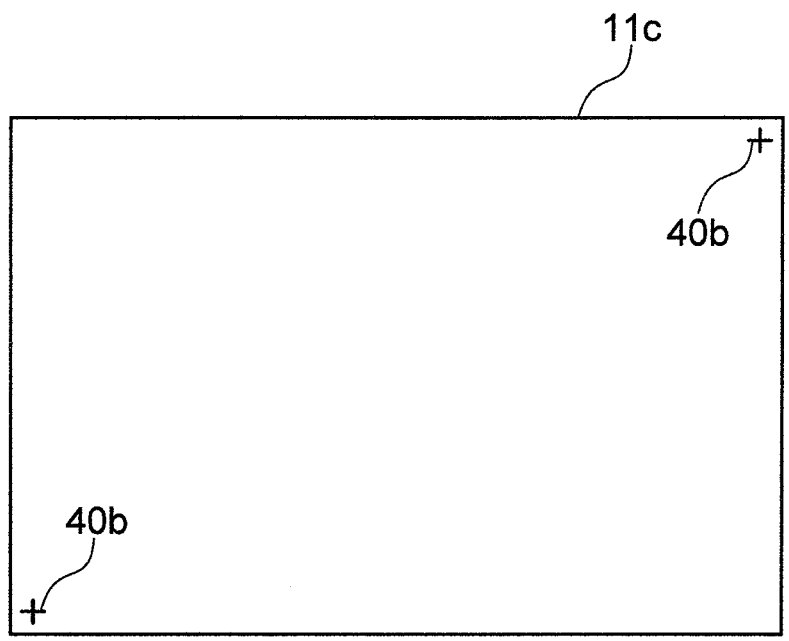

The liquid crystal panel and the light conversion layer need to be combined with each other by positioning them such that corresponding pixel and lens of micro-lens array can be positioned in register with each other and to this end, positioning marks are necessary for the two constituent components. A positioning mark formed of a layer of high light absorption factor is convenient for its clear observation and in particular, black resist used for the black matrix 14 is optimal because it can absorb light rays of all visible wavelengths. By utilizing the black resist used for black matrix 14, the positioning mark can be formed at the edge of the light conversion layer. Illustrated in FIG. 11B is an example where positioning marks 40b are formed at two corner edge portions of the third substrate 11c of light conversion layer and illustrated in FIG. 11A is an example where positioning marks 40a are formed at two corner edge portions, corresponding to or in register with the marks 40b, of the second substrate 11b on the liquid crystal panel side. To ameliorate the positioning accuracy, the two positioning marks are designed to be spaced from each other and the positioning marks shown in FIG. 11A or 11B are arranged so as to be diagonally spaced on the substantially rectangular light conversion layer or liquid crystal display panel. It will be appreciated that in FIGS. 11A and 11B, the positioning mark is illustrated as being larger than its practical size.

As described above, in the present embodiment, no matter when the color filter is removed from the liquid crystal panel to simplify the structure, display characteristics of high color purity similar to those in embodiment 1 can be obtained.

Embodiment 5

In the liquid crystal display device of embodiment 1, the liquid crystal display panel is of the transmission type but in the present embodiment, a transflective type liquid crystal display panel is employed. The transflective type liquid crystal display panel has a reflective display portion and a transmissive display portion within one pixel, as exemplarily illustrated in sectional form in FIG. 12A.

The second substrate 11b is changed such that a reflective common electrode 18' made of aluminum is superimposed on the common electrode 18 at a position corresponding to the reflective display portion. As regards the first substrate 11a, a phase difference plate 26 and a step forming layer 27 are arranged at a portion corresponding to the reflective display portion. The phase difference plate 26 is prepared through photo-polymerization of diacrylic system liquid crystal. The phase difference plate 26 has a retardation of 310 nm and the step forming layer 27 causes the liquid crystal layer 10 of reflective display portion to exhibit a retardation of 160 nm. In addition, the phase difference plate 26 is designed to have a delay phase axis which makes an angle of 67.5° to the liquid crystal alignment direction, thereby ensuring that the polarization state of light incident on the reflective common electrode 18' during no voltage application can be of circular polarization and the reflective display and the transmissive display can both be a normally closed display.

By dividing one pixel in area into the reflective display portion and transmissive display portion, the area of the transmissive display portion decreases. But, in the present invention, rays of the light source are concentrated on the transmissive display portion by means of the light conversion layer and so brightness does not almost decrease as compared to the liquid crystal display device of embodiment 1 and besides the reflective display can also be obtained to advantage.

Figure 12A:
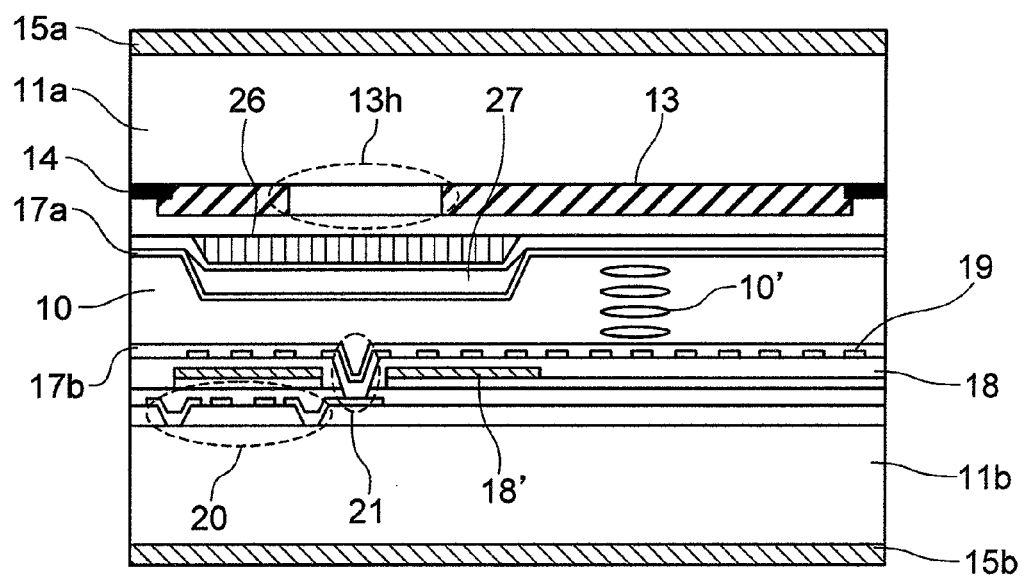
FIGS. 12A and 12B are sectional views of one pixel constituting a transflective type liquid crystal panel.
Figure 12B:
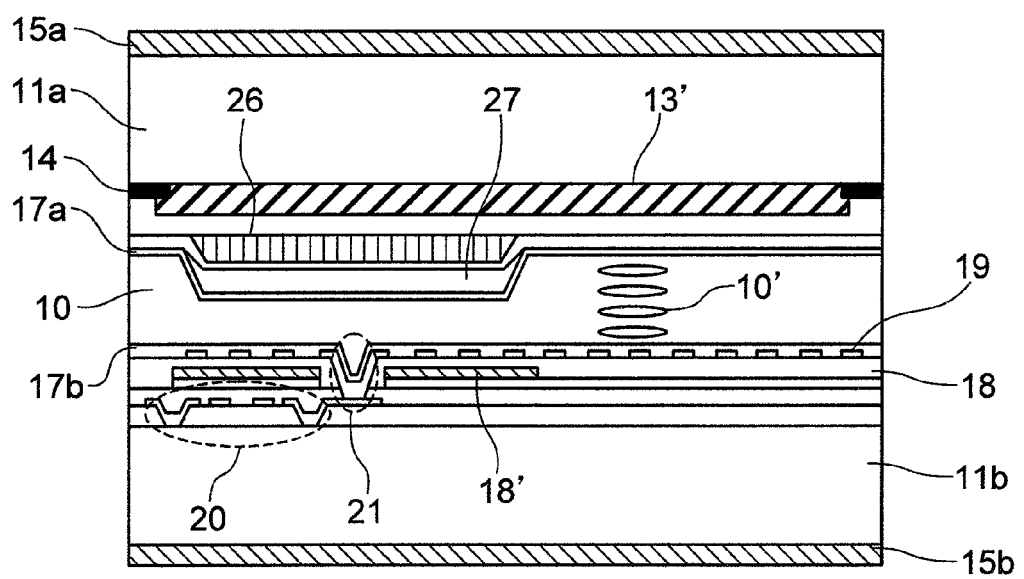

In contrast to the fact that the light passes through the color filter 13 twice in the reflective display portion, the light passes only once in the transmissive display portion. Then, in order to make equal the color reproductivity ranges of the transmissive and reflective display portions, the absorption factor of the color filter 13 needs to be changed for the reflective display portion and the transmissive display portion. More specifically, as shown in FIG. 12A, a color filter opening 13h devoid of the color filter 13 is arranged at part of the reflective display portion to thereby reduce the absorption factor over an averaged area of the reflective display portion. But, in the event that the area of color filter opening 13h deviates from a design value, there arises a problem that the color balance of reflective display will collapse.

In the present invention, the color display of transmissive display portion is determined by coloring of the light source ray and therefore, the color filter 13 need not be provided for the transmissive display portion in principle. This makes it possible to uniformly arrange, as shown in FIG. 13B, a color filter 13' for reflective display whose absorption factor is optimized for reflective display over the entire surface within the pixel including the reflective and transmissive display portions.

The color filter having the low absorption factor for reflective display cannot absorb sufficiently incident stray light of color different from display color of each pixel and a degradation in color reproductivity range takes place. In such an event, the degradation in color reproductivity range attributable to the stray light can be prevented by means of the color conversion layer having a black matrix arranged similarly to embodiment 3.

With the phase difference plate 26 incorporated in the reflective display portion, the optical member bonded to the first and second substrates 11a and 11b of the liquid crystal display panel includes only the first and second polarization plates 15a and 15b, having an advantage that the liquid crystal display device as a whole can be thinned.

The reflective display portion adapted to reflect light coming from the neighborhood and display it has a contrast ratio which is constant irrespective of brightness. In the transmissive display, the contrast ratio decreases under the influence of interface reflection when the light coming from the neighborhood is more intensive than the backlight but in the reflective display, the contrast ratio will not be reduced even in such an event. Therefore, in the bright environment such as daytime outdoors, a display more excellent than the transmissive display can be obtained.

As described above, in the present embodiment, the liquid crystal display panel is made to be the transflective type to ensure that the legibility at bright quarters can be improved while maintaining the transmissive display brightness as in the case of embodiment 1.

Embodiment 6

In the present embodiment, an example of a light conversion layer structured differently from that in other embodiments will be described. In embodiment 1, in addition to the first and second substrates 11a and 11b constituting the liquid crystal display panel, the third substrate 11c is separately or additionally used for the light conversion layer. But in the present embodiment, without using the third substrate 11c, the first micro-lens array 12a and the fluorescent layer are formed on the light guide and the second micro-lens array 12b is formed on the second substrate 11b.

Figure 13A:
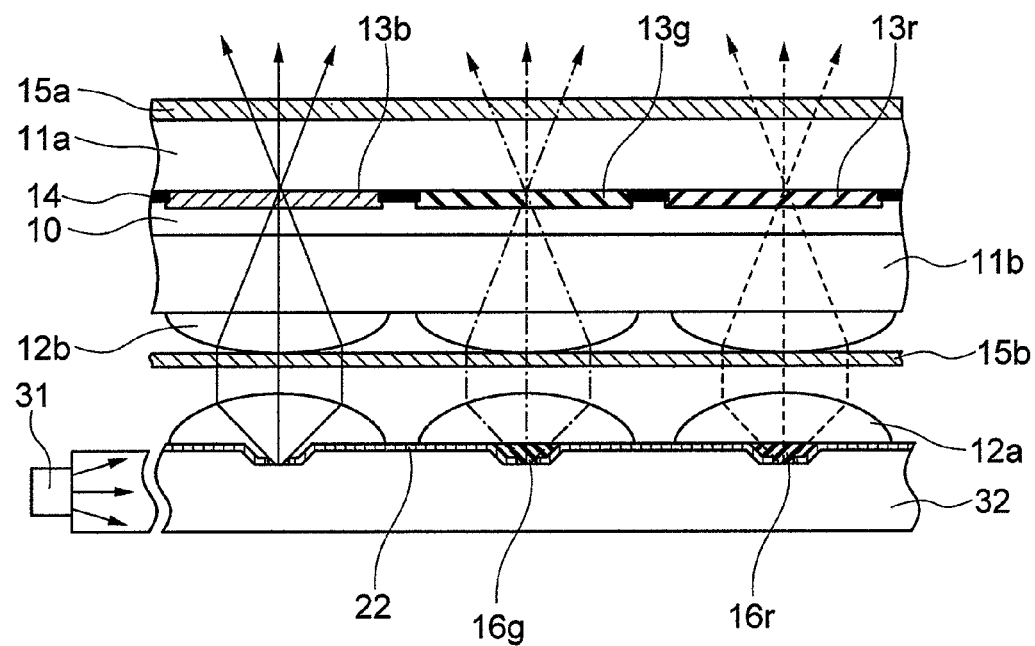
FIGS. 13A and 13B are sectional diagrams for explaining principal constituent members and their function when the light conversion layer is formed without using the third substrate.
Figure 13B:
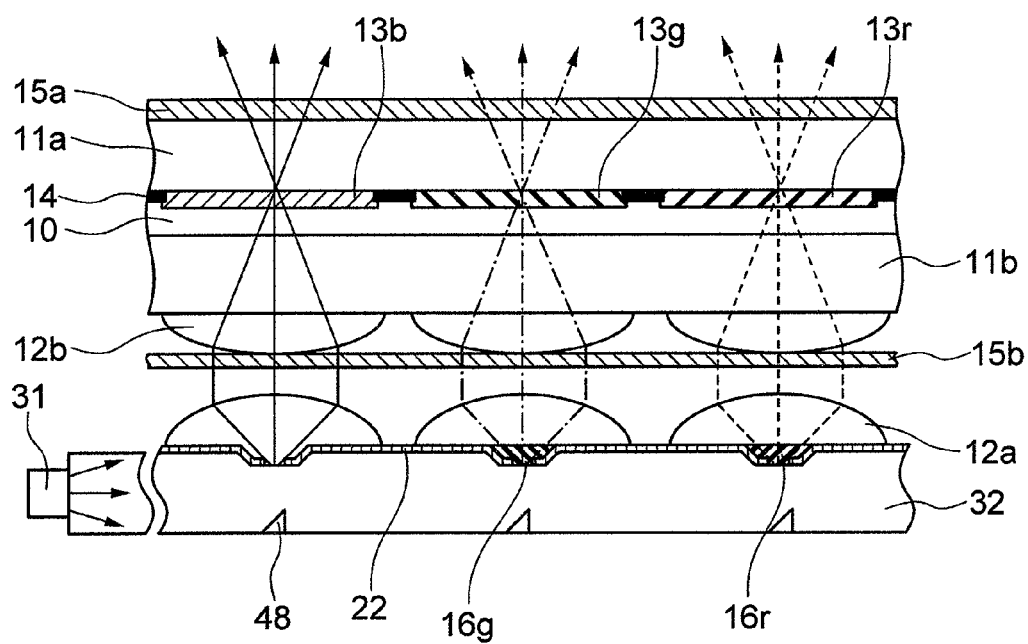

Referring to FIG. 13A, an example of construction of a liquid crystal display device according to the present embodiment will be described. A fluorescent layer and a fluorescence reflective layer 22 are arranged on the upper surface of light guide and a first micro-lens array 12a is arranged on the fluorescent layer, having lenses each being convex in section to oppose the side on which the liquid crystal panel is arranged. Blue light emitting from a light source 31 at one end of light guide 32 undergoes multiple reflection inside the light guide 32 to come to the fluorescent layer to cause it to luminesce. Luminescent rays diverge in an isotropic fashion about the center of a fluorescent material of fluorescent layer. Since the fluorescent material is positioned at a focal point a lens of the first micro-lens array 12a has, a component of fluorescence heading frontally comes to the lens of first micro-lens array 12a so as to be converted into a parallel ray. Part of a component heading for the rear and components heading for the opposite ends are reflected by the fluorescence reflective layer 22 and are caused to go frontally and thereafter come to the lens of first micro-lens array 12a so as to be converted into a parallel ray. The resulting fluorescence passes through a second polarization plate 15b and then comes to the second micro-lens array 12b having lenses each being concave in section to oppose the side on which the light guide 32 is arranged. Here, the fluorescence undergoes concentrative function based on the second micro-lens array 12b so as to be concentrated on the center of a corresponding pixel. In this case, the second micro-lens array 12b receives substantially collimated incident fluorescent rays and concentrates them on the proximity of center of the pixel for which the second substrate 11b intervenes. Accordingly, the lens of second micro-lens array 12b features a focal distance which is considerably longer than that of the lens of first micro-lens array 12a.

In this case, it is necessary for the liquid crystal panel and the light guide 32 to be in register with each other and positioning marks may be formed at edges of the light guide 32 and liquid crystal display panel. This resembles the contents described previously in connection with FIGS. 11A and 11B.

To improve the efficiency of incidence of the blue light from light source 31 on the fluorescent layer, a blazed grating 48 is arranged under the fluorescent layer as shown in FIG. 13B. As has been explained in connection with embodiment 1, the blazed grating 48 can be so designed as to reflect the light source ray in the normal direction of the light guide 32. With the fluorescent material lying directly above the element of blazed grading 48, the light source ray reflected at the element of blazed grating 48 can be directly incident on the fluorescent material of fluorescent layer.

In FIGS. 13A and 13B, the previously-described light scattering layer is not provided for the light conversion layer corresponding to the blue color display pixel but for the same reason explained in connection with embodiment 3, the light source per se will sometimes change in color tone as the emission angle changes. If the light scattering layer is provided for the light conversion layer corresponding to the blue color display pixel in the structure of the present embodiment, the angle change dependent color tone change of the light source per se can be eliminated similarly.

In the present embodiment, an optical film is bonded to the outer surface of the second micro-lens array 12b but because of bonding to an uneven surface, bonding force will sometimes be insufficient. Then, if the second polarization plate 15b in the form of a grid wire polarization plate is arranged internally of the liquid crystal panel, bonding of the optical member to the second micro-lens array 12b can be unneeded. The grid wire polarization plate is a metal film having slits formed at a pitch of less than the wavelength of light to prevent free electrons in the metal film from moving in a direction vertical to the slit, thus exhibiting such a nature that a linearly polarized component in the slit direction can be reflected and a linearly polarized component in the direction vertical to the slit can be passed.

As described above, with the thinner and lighter structure devoid of the third substrate 11c, a liquid crystal display device exhibiting high efficiency like embodiment 1 can be realized.

Embodiment 7

While in embodiment 1 each of the first and second micro-lens arrays 12a and 12b has lenses in the form of stripes, the shape of micro-lens array lens is not limited thereto and for example, respective micro-lenses may have a spherical surface and arranged in a honeycomb fashion.

Figure 14:
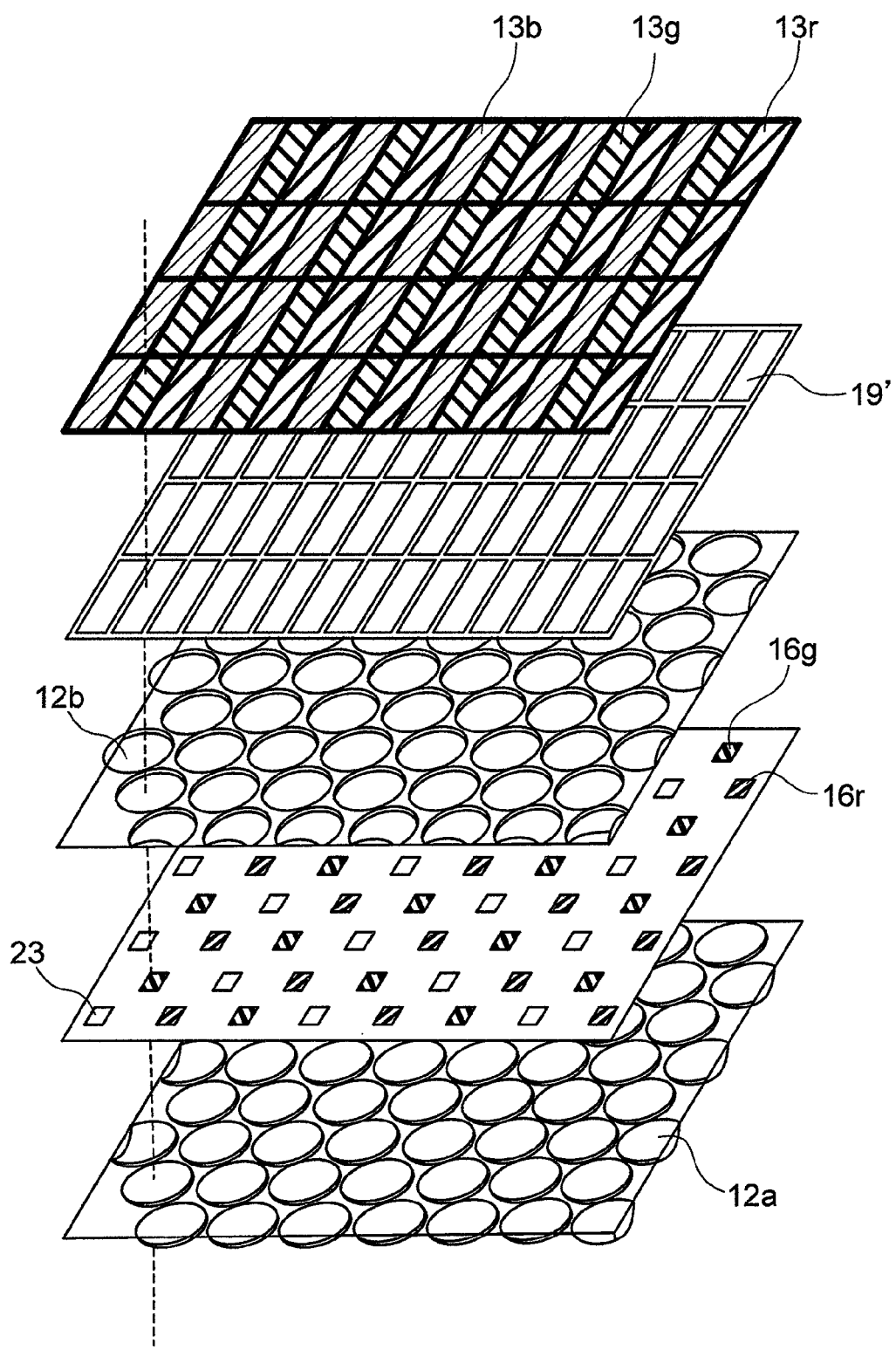
FIG. 14 is an exploded perspective diagram showing a combination of pixels with a circular micro-lens array in honeycomb arrangement.

Referring to FIG. 14, distribution in each of the first micro-lens array 12a, fluorescent layer, second micro-lens array 12b, pixel layer and color filter layer is observed in the normal direction. The lens of each of the first and second micro-lens arrays 12a and 12b is circular and the above component members are laminated or stacked such that the lens of first micro-lens 12a, the fluorescent material of fluorescent layer in the form of a square dot being smaller in size than the micro-lens and the lens of second micro-lens array 12b are centered one another as viewed in the normal direction. On the other hand, the pixels and color filters are arranged in a stripe fashion. In this case, too, these components members can be combined by making the repeat period of the micro-lens array twice the length of pixel minor side. In each pixel, a portion where the fluorescent rays and light source rays are concentrated deviates from the center of the pixel but as far as the concentrative function of the micro-lens array is sufficient, fluorescent rays of each color and light source rays can be concentrated on a pixel of corresponding color.

Figure 15:
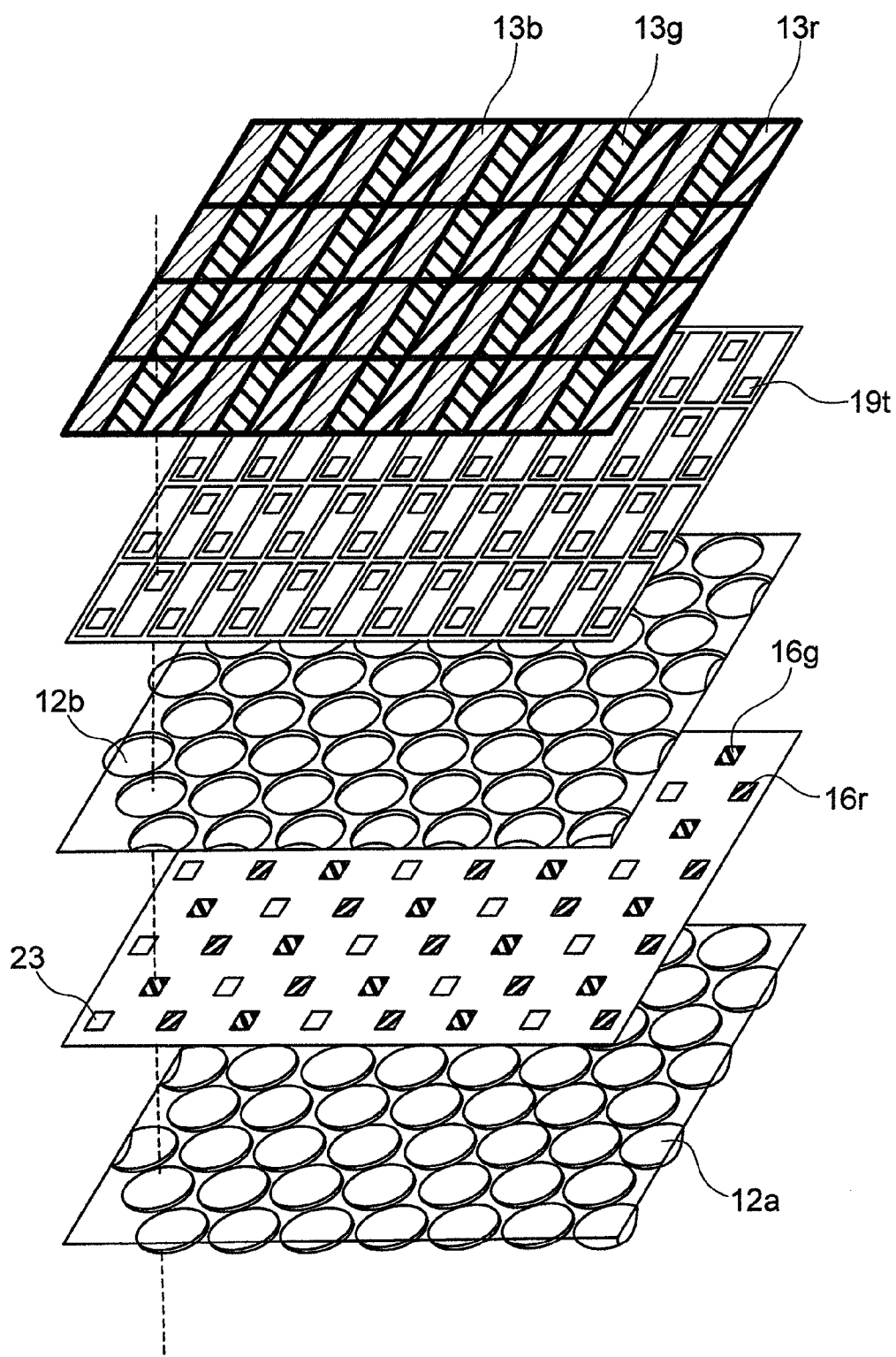
FIG. 15 is an exploded perspective diagram showing a combination of transflective pixels with a circular micro-lens array in honeycomb arrangement.

Conceivably, the rectangular pixel in stripe arrangement may be combined with the micro-lens array in circular honeycomb arrangement and each pixel may be of transflective type. In this case, a transmissive display portion is required to be arranged at the portion on which the fluorescent rays and light source rays are concentrated and as shown in FIG. 15, transmissive portion pixel electrodes 19t are each arranged at a position clear of the pixel center in a staggered fashion. With this construction, even in the transflective type liquid crystal having a constant ratio of one pixel as reflective type display, the transmissive display efficiency similar to that in the total transmission type can be obtained.

Apart from the pixels arranged in a stripe fashion as shown in FIGS. 14 and 15, respective pixels may be shaped into a square form and arranged in delta arrangement and in such an instance, the honeycomb arrangement is more preferable because the quantity of light concentrated on one pixel can be increased to improve the efficiency.

Embodiment 8

In embodiment 1, the liquid crystal display panel is of the IPS type in which an electric field is applied between the comb-teeth shaped pixel electrode 19 and the planar common electrode 18 which are formed on the mutually different levels. Apart from this, an IPS type liquid crystal display panel may be used in which a lateral electric field is set up between a comb-teeth shaped pixel electrode and a comb-teeth shaped common electrode. In this case, too, a wide viewing angle display exhibiting excellent gradation display characteristics in the viewing angle direction as in embodiment 1 can be obtained.

Alternatively, a so-called longitudinal electric field type may be employed in which a common electrode 18 is formed on the surface of first substrate 11a close to the liquid crystal layer 10, the common electrode 18 and pixel electrode 19 are both made to be planar and an electric field is applied in the normal direction of the first and second substrates 11a and 11b. The liquid crystal layer 10 may be of either the twisted nematic type having a twist angle of 90° or the electric field double refraction type of homogeneous alignment. These types can dispense with fine electrode work needed for the IPS type and abounds in mass production capability. In order to attain a transflective display with the longitudinal electric field type, a plurality of phase difference plates may be interposed between the first substrate 11a and first polarization plate 15a and between the second polarization plate 15b and second substrate 11b, respectively, and the delayed phase axis angle and Δnd may be set to cause the polarization state of light reaching the reflective plate during dark display to be circular polarization. This gives rise to an advantage that the transflective display can be obtained without forming the phase difference layer internally of the liquid crystal display panel.

By making fluorescent rays and light source rays of respective colors selectively incident on pixels of corresponding colors, highly efficient displays can also be obtained when the aforementioned types of liquid crystal panels are used in combination.

It should be further understood by those skilled in the art that although the foregoing description has been on embodiments of the invention, the invention is not limited thereto and various change and modifications may be made without departing from the spirit of the invention and the scope of the appended claims.

The invention claimed is:

1. A liquid crystal display device comprising:
a liquid crystal panel including a first substrate, a second substrate and a liquid crystal layer sandwiched between said first and second substrates;
a light source for emitting rays of blue light; and
a light conversion layer arranged between said liquid crystal panel and said light source and including a first micro-lens array having a plurality of lenses arranged, a second micro-lens array having a plurality of lenses arranged and a fluorescent layer arranged between said first and second micro-lens arrays.

2. A liquid crystal device according to claim 1, wherein said first micro-lens array of said light conversion layer has the function to concentrate the rays of blue light from said light source on said fluorescent layer, and said second lens array of said light conversion layer has the function to concentrate fluorescent rays emitted from said fluorescent layer or the blue light rays from said light source on a corresponding pixel inside said liquid crystal panel.

3. A liquid crystal display device according to claim 2 further comprising a light guide arranged between said light source and said light conversion layer and causing the blue light rays from said light source to be directed to said light conversion layer.

4. A liquid crystal display device according to claim 2, wherein each of said plurality of lenses of said first micro-lens array has a sectional form which is convex toward the side on which said light source is arranged, and each of said plurality of lenses of said second micro-lens array has a sectional form which is convex toward the side on which said liquid crystal panel is arranged.

5. A liquid crystal display device according to claim 2, wherein said liquid crystal panel includes a plurality of pixels and a plurality of color filters, said fluorescent layer has fluorescent materials for red color and fluorescent materials for green color and said red fluorescent material and green fluorescent material are arranged in correspondence with colors of said color filters associated with respective ones of said plural pixels.

6. A liquid crystal display device according to claim 2, wherein lenses of said first micro-lens array and lenses of said second micro-lens array are distributed identically in a planar configuration.

7. A liquid crystal display device according to claim 3, wherein said light source has a blue light emitting diode, said blue light emitting diode is arranged at one end of said light guide, said light guide is mounted with a hologram or a blazed grating, and said hologram or blazed grating converts luminescence of said blue light emitting diode into a plane light source to cause the luminescence to be directed toward the normal direction of said liquid crystal panel.

8. A liquid crystal display device according to claim 2, wherein the fluorescent material of said fluorescent layer is arranged at a focal point position of the lens of said first micro-lens array.

9. A liquid crystal display device according to claim 2, wherein the fluorescent material of said fluorescent layer is arranged remotely from the lens of said second micro-lens array in excess of its focal point position.

10. A liquid crystal display device according to claim 2 further comprising a leveling portion provided between adjacent ones of said plurality of lenses each of said first and second micro-lens arrays has and a leveling portion absorptive or reflective layer is arranged between the adjacent lenses of each of said first and second micro-lens arrays in association with a corresponding leveling portion.

11. A liquid crystal display device according to claim 1, wherein marks for positioning said light conversion layer and said liquid crystal panel are formed on said light conversion layer and said liquid crystal panel.

12. A liquid crystal display device according to claim 2, wherein said light conversion layer includes a third substrate, said first and second micro-lens arrays are formed on opposite surfaces of said third substrate, and said fluorescent layer is formed on said third substrate.

13. A liquid crystal display device according to claim 2, wherein said liquid crystal panel has a plurality of pixels and each of said plurality of pixels is associated with a comb-teeth or slit shaped pixel electrode and a common electrode formed all over the pixels.

14. A liquid crystal display device according to claim 2, wherein said liquid crystal panel has a plurality of pixels and each of said plurality of pixels has a transmissive display portion and a reflective display portion.

15. A liquid crystal display device comprising:
    a liquid crystal panel including a first substrate, a second substrate and a liquid crystal layer sandwiched between said first and second substrates;
    a pair of polarization plates for putting said liquid crystal panel therebetween;
    a light source for emitting rays of blue light;
    a light guide arranged between said liquid crystal panel and said light source;
    a light conversion layer arranged between said liquid crystal panel and said light guide and including a first micro-lens array having a plurality of lenses arranged, a second micro-lens array having a plurality of lenses arranged and a fluorescent layer arranged between said first micro-lens arrays and said light guide; and
    a fluorescence reflective layer arranged between said light guide and said fluorescent layer,
    wherein one of said paired polarization plates is arranged between said first and second micro-lens arrays.

16. A liquid crystal display device according to claim 15, wherein said first micro-lens array of said light conversion layer has the function to concentrate on said fluorescent layer the blue light rays emitting from said light source and coming to said light guide, and said second lens array of said light conversion layer has the function to concentrate on a corresponding pixel inside said liquid crystal panel fluorescent rays from said fluorescent layer or the blue light rays from said light source both going out through said one of polarization plates.

17. A liquid crystal display device according to claim 15, wherein each of said plurality of lenses of said first micro-lens array has a sectional form which is convex toward the side on which said liquid crystal panel is arranged, and each of said plurality of lenses of said second micro-lens array has a sectional form which is convex toward the side on which said light source is arranged.

18. A liquid crystal display device according to claim 15, wherein said light guide has a blazed grating.

19. A liquid crystal display device according to claim 15, wherein said liquid crystal panel has a plurality of pixels and each of said plurality of pixels is associated with a comb-teeth or slit shaped pixel electrode and a common electrode formed all over the pixels.

* * * * *